3,372,200
TETRAORGANOBORON-PHOSPHORUS COORDINATION COMPLEX COMPOUNDS
Charles J. Stern, Jr., Westfield, and Edward G. Budnick, Scotch Plains, N.J., assignors to Plains Chemical Development Co., Roselle, N.J., a corporation of New Jersey
No Drawing. Continuation-in-part of application Ser. No. 47,943, Aug. 8, 1960. This application Oct. 23, 1964, Ser. No. 406,145
8 Claims. (Cl. 260—606.5)

This application is a continuation-in-part of application 47,943, filed Aug. 8, 1960, and now abandoned.

This invention relates to engine fuel additives and to methods for the preparation thereof. More particularly, the invention relates to coordination compounds formed from trivalent phosphorus-containing compounds and trivalent boron-containing compounds; their preparation; and their application as additives to motor fuels.

Organo metallic fuel additives have been known heretofore for use in control of the burning and combustion characteristics of motor fuels; and thus in effecting greater engine performance and efficiency. Normally, however, such additives have been expensive and very specific with respect to their utility; a particular engine construction requiring, for example, a definite and highly selective organo metallic composition to effect a result justifying the addition thereof.

Accordingly, the present invention provides low-cost fuel additive compositions for use in motor fuels, each having a wide and effective range of applicability and possessing a marked stability against air oxidation and against hydrolysis under the conditions of manufacture, storage and use. These compounds are found to be substantially noncorrosive, they exhibit low vapor pressures, and are highly soluble, particularly in aromatic and aliphatic hydrocarbon solvents.

When introduced into conventional motor fuel compositions, the additives of the invention have been found to be capable of reducing carbon-metallic engine deposits in the combustion chamber and associated engine parts resulting from lead and manganese antiknock fuel components and to modify the nature of the engine deposits where formed by effectively fireproofing the same to eliminate preignition of the fuel, and by destruction of the catalytic effects of lead oxide and manganese oxide deposits which tend to promote multiple surface ignition effects.

The boron-phosphorus additives described herein accomplish these objectives; reduce the normal octane requirement increase of engines; reduce sparkplug fouling and misfiring; restore power and improve fuel consumption in dirty engines; raise the effective octane value of motor fuel; and reduce the knock and rumble caused by surface ignition and preignition, thereby effecting an overall increase in engine performance and economy. Further objects and advantages of the invention will become evident in the course of the detailed description presented hereinafter.

The coordination complexes for use as fuel additives in the practice of the present invention comprise a trivalent boron component as the electron acceptor and a trivalent phosphorus compound as the electron donor. Thus, the nucleus of the compounds for use herein comprises a combination of boron and phosphorus ($\equiv$B·P$\equiv$), wherein the boron and phosphorus moieties are constituents of boron and phosphorus compounds, respectively.

The borine halides and phosphine halides are to be avoided since they tend to be hydrolytically unstable.

The novel complexes of the invention may be represented in general by the formula:

(I) $\qquad ([R]\equiv B)_y \cdot (P\equiv [R'])_y$ and (II) $\qquad R''_b B_a H_{(a+c-b)} \cdot (P\equiv [R'])_{(1-a)}$ wherein B represents a trivalent boron moiety and P represents a trivalent phosphorus moiety; and wherein R represents the residual portion of a borinate, boronate, or borate component; a hydrocarbyl boron oxide, glycol borate, glycol boronate or a borine; R' is the residual portion of a component which with the aforesaid trivalent phosphorus component constitutes a phosphite, phosphonite, phosphinite, a glycol phosphite, glycol phosphonite, or where R is a borine containing at least one hydrocarbyl substituent of at least 4 carbon atoms, a phosphine; R'' is a hydrocarbyl radical; $a$ is an integer from 2 to 10 inclusive; $c$ is either 4 or 6; $b$ has a value of 0 to 16; and $y$ is an integer of 1 to 2 inclusive. It will be evident that the expression $(1-a)$ as employed herein refers to a value within the numerical range of 1 to the value of $a$ as recited hereinabove.

The term "hydrocarbyl" as employed herein is intended to encompass aliphatic and aromatic monovalent hydrocarbon radicals, preferably alkyl and aryl having up to 10 carbon atoms. The alkyl group normally has at least 4 carbon atoms. While most of the substituents are hydrocarbon in the case of borates and phosphites there can be used chloroaryl groups.

The term "borine" as employed throughout this specification refers to compounds composed of a single boron atom having hydrocarbyl substituents attached thereto. The term "borane" on the other hand is utilized herein to encompass compounds formed of a plurality of boron atoms (i.e. 2 to 10 in number) having attached thereto hydrocarbyl and/or hydrogen substituents. The boranes are polymeric borines.

Encompassed within the general Formula I therefore are novel compounds of the following classes:

Boron-phosphorus containing coordination compounds, i.e. borine-phosphites, borine-phosphonites and borine-phosphinites of the formula:

$$R^4{}_3B \cdot PR^2{}_{(3-n)}(OR^2)_n$$

wherein $R^4$ is a hydrocarbyl radical and each $R^2$ is a hydrogen atom or a hydrocarbyl radical, e.g. alkyl or aryl and $n$ is an integer from 1 to 3 inclusive.

The meanings of the above-defined symbols remain the same in the following formulae which further depict classes of coordination compounds encompassed by the general Formula I above, and, accordingly, the definition of the newly introduced variables, only, will be given as they occur. Since the meaning of such newly introduced symbols will, in turn, remain constant in any subsequent formulae, their definition will likewise not be repeated from formula to formula.

Thus, also contemplated within the general Formula I are the borine-glycol phosphites of the formulae:

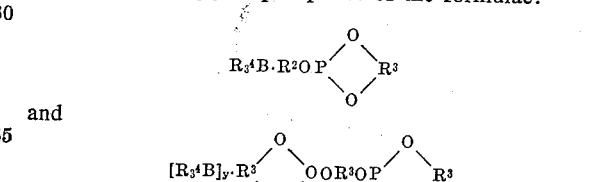

where $R^3$ is a divalent alkylene group derived from an alkane diol or a divalent arylene radical derived from a ring dihydroxyl aromatic hydrocarbon, and $y$ is an integer from 1 to 2 inclusive; the borine-glycol phosphonite coordination complexes of the formula:

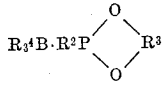

the hydrocarbyl borine-phosphine of the formula:

$$R_3''B \cdot [PR_3^2]_n$$

borane-phosphine coordination compounds represented by the formula:

$$B_aH_{(a+c)} \cdot [PR_3^2]_{(1-a)}$$

wherein $a$ is an integer within the range of 2 to 10 and $c$ is 4 or 6; the borane-trivalent phosphorus containing coordination compounds, i.e., borane-phosphites, borane-phosphonites, borane-phosphinates of the formula:

$$B_aH_{(a+c)} \cdot [PR^2_{(3-n)}(OR^2)_n]_{(1-a)}$$

borane glycol phosphites of the formula:

$$B_aH_{(a+c)} \cdot [PR^2_{(3-n)}(OR^2)_n]_{(1-a)}$$

borane glycol phosphites of the formula:

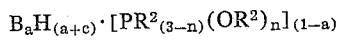

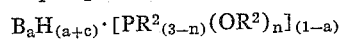

borane-glycol phosphonite coordination complexes of the formula:

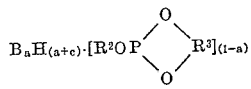

boron (i.e. borinate, boronate, borate)-phosphine coordination compounds of the formula:

$$R^4_{(3-n)}(R^4O)_nB \cdot PR_3^2$$

boron-phosphorus coordination compounds of the type of boronate-phosphites, boronate-phosphonites, boronate-phosphinites, borinate-phosphites, borinate-phosphonites, borinate-phosphinites, borate-phosphites, borate-phosphonites, and borate-phosphinites as represented by the formula:

$$R^4_{(3-n)}(R^4O)_nB \cdot PR^2_{(3-n)}(OR^2)_n$$

boronic, borinic and borate-glycol phosphites of the formulae:

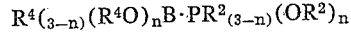

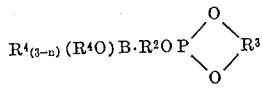

borinic, boronic and borate-glycol phosphonites of the formula:

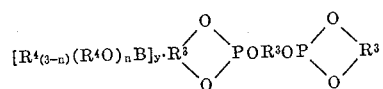

hydrocarbyl boron oxide-phosphines of the formula:

$$R^4BO \cdot PR_3^2$$

and also the hydrocarbyl boron oxide-phosphites, hydrocarbyl boron oxide-phosphonites, and hydrocarbyl boron oxide-phosphinites represented by the formula:

$$R^4BO \cdot PR^2_{(3-n)}(OR^2)_n$$

the hydrocarbyl boron oxide-glycol phosphites of the formulae:

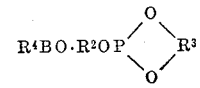

and

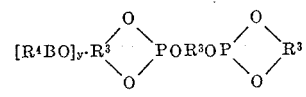

the hydrocarbyl boron oxide-glycol phosphonite coordination compounds of the formula:

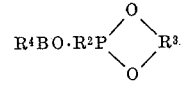

dihydrocarbyl boron oxide-phosphines as represented by the formula:

$$(R^4_2B)_2O \cdot [PR^2_3]_y$$

dihydrocarbyl boron oxide-phosphites, dihydrocarbyl boron oxide-phosphonites and dihydrocarbyl boron oxide-phosphinites as represented by the formula:

$$(R^4_2B)_2O \cdot [PR^2_{(3-n)}(OR^2)_n]_y$$

dihydrocarbyl boron oxide-glycol phosphites of the formulae:

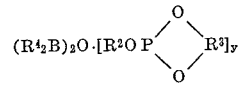

and

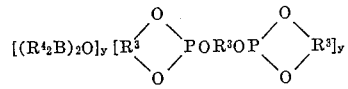

the dihydrocarbyl boron oxide-glycol phosphonite coordination compounds of the formula:

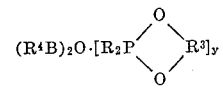

glycol borate-phosphines of the formulae:

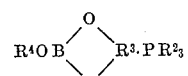

and

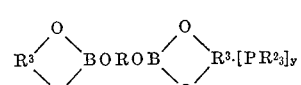

glycol borate-phosphite, glycol borate-phosphonite and glycol borate-phosphinite coordination compounds of the formulae:

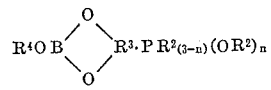

and

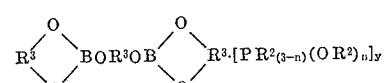

glycol borate-glycol phosphite coordination compounds as represented by the following formulae:

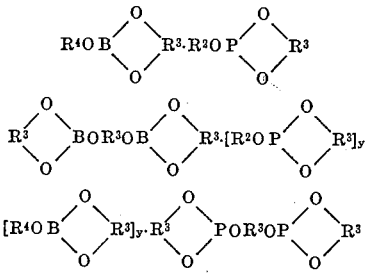

and

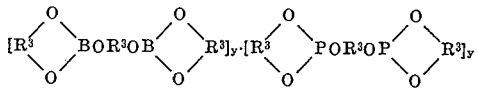

glycol borate-glycol phosphonite coordination compounds of the formulae:

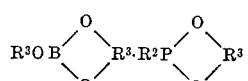

and

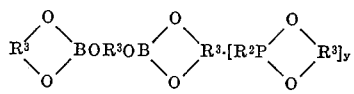

the glycol boronate-phosphine coordination compounds of the formula:

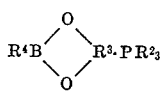

the glycol boronate-phosphites, glycol boronate-phosphonites and glycol boronate-phosphinites represented by the formula:

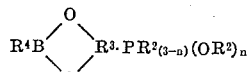

glycol boronate-glycol phosphites of the formulae:

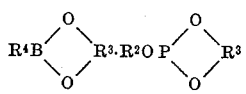

and

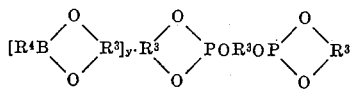

and the glycol boronate-phosphonite coordination compounds represented by the formula:

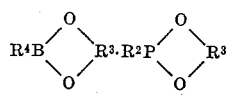

When the borates and phosphites are employed instead of $R^2$ there can be a chloroaryl group.

Illustrative of the novel compounds within the purview of the above classes of coordination compounds which form effective fuel additives within the practice of the present invention are triphenyl borane-tributyl phosphine,
$$(C_6H_5)_3B \cdot P(C_4H_9)_3$$
triphenylborine-triphenyl phosphine,
$$(C_6H_5)_3B \cdot P(C_6H_5)_3$$
tributyl borine-tributyl phosphine,
$$(C_4H_9)_3B \cdot P(C_4H_9)_3$$
trimethyl borate-tributyl phosphine,
$$(H_3CO)_3B \cdot P(C_4H_9)_3$$
tri-o-chlorophenyl borate-tributyl phosphine,
$$(ClC_6H_4O)_3B \cdot P(C_4H_9)_3$$
diborane-trimethyl phosphine,
$$B_2H_6 \cdot [P(CH_3)_3]_y$$
pentaborane-diphosphine,
$$B_5H_9 \cdot (PH_3)_2$$
decaborane-diphosphine,
$$B_{10}H_{14} \cdot (PH_3)_2$$
pentaborane-di(trimethylphosphine),
$$B_5H_9 \cdot (PCH_3)_2$$
decaborane-di(trimethylphosphine),
$$B_{10}H_{14} \cdot (PCH_3)_2$$
phenyl-dimethylboronate-trimethyl phosphine,
$$(C_6H_5)B(OCH_3)_2 \cdot P(CH_3)_3$$
diphenyl-methyl borinate-trimethyl phosphine,
$$(C_6H_5)_2B(OCH_3) \cdot P(CH_3)_3$$
tri-o-chlorophenyl borate-trimethyl phosphine,
$$(ClC_6H_4O)_3B \cdot P(CH_3)_3$$
diphenyl diboron oxide-trimethyl phosphine,
$$[(C_6H_5)_2B]_2O \cdot P(CH_3)_3$$
glycol methyl boronate-trimethyl phosphine, $(CH_3)\overline{B-OCH_2O} \cdot P(CH_3)_3$ trimethyl borine-trimethyl phosphite,
$$(CH_3)_3B \cdot P(OCH_3)_3$$
diborane-trimethyl phosphite,
$$B_2H_6 \cdot P(OCH_3)_3$$
phenyl dimethyl boronate-trimethyl phosphite,
$$(C_6H_5)B(OCH_3)_2 \cdot P(OCH_3)_3$$
diphenyl methyl borinate-trimethyl phosphite,
$$(C_6H_5)_2B(OCH_3) \cdot (OCH_3)_3$$
tri-o-chloro phenyl borate-trimethyl phosphite,
$$(ClC_6H_4O)_3B \cdot P(CH_3O)_3$$
diphenyl boron oxide trimethyl phosphite,
$$[(C_6H_5)_2B]_2O \cdot P(OCH_3)_3$$
glycol methyl boronate-trimethyl phosphite, $CH_3-\overline{B-OC_2H_4O} \cdot P(CH_3O)_3$ trimethyl borine-dimethyl methyl phosphonite,
$$(CH_3)_3B \cdot PCH_3(OCH_3)_2$$
boron trifluoride-dimethyl methyl phosphonite,
$$F_3B \cdot PCH_3(OCH_3)_2$$
diborane-dimethyl methyl phosphonite,
$$H_6B_2 \cdot P(OCH_3)_2CH_3$$
phenyl dimethylboronate-dimethyl methyl phosphonite,
$$(C_6H_5)B(OCH_3)_2 \cdot (CH_3O)_2PCH_3$$
diphenyl methyl borinate-dimethyl methyl phosphonite,
$$(C_6H_5)_2(CH_3O)B \cdot PCH_3(OCH_3)_2$$
tri-o-chloro phenyl borate-dimethyl methyl phosphonite,
$$(ClC_6H_4O)B \cdot (CH_3O)_2PCH_3$$
diphenyl diboron oxide dimethyl methyl phosphonite,
$$[(C_6H_5)_2B]O \cdot (CH_3O)_2P(CH_3)$$
glycol methyl boronate-dimethyl methyl phosphonite, $CH_3-\overline{B-OC_2H_4O} \cdot (CH_3O)_2P(CH_3)$ trimethyl borine-methyl dimethyl phosphinite,
$$(CH_3)_3B \cdot (CH_3O)P(CH_3)_2$$
diborane-methyl dimethyl phosphinite,
$$B_2H_6 \cdot (CH_3O)P(CH_3)_2$$

phenyl dimethyl boronate-methyl dimethyl phosphinite, $$C_6H_5B(OCH_3)_2 \cdot (CH_3O)P(CH_3)_2$$

diphenyl methyl borinate-methyl dimethyl phosphinite, $$(C_6H_5)_2B(OCH_3) \cdot (CH_3O)P(CH_3)_2$$

tri-o-chloro phenyl borate-methyl dimethyl phosphinite, $$(ClC_6H_4O)_3B \cdot (CH_3O)P(CH_3)_2$$

diphenyl boron oxide methyl dimethyl phosphinite $$[(C_6H_5)_2B]_2O \cdot (CH_3O)_2P(CH_3)_2$$

glycol methyl boronate-methyl dimethyl phosphinite, $$CH_3 \overline{-B-O\,C_2H_4O} \cdot (CH_3O)P(CH_3)_2$$

phenyl dimethyl boronate, $$(C_6H_5)B(OCH_3)_2 \cdot PCl_3$$

trimethyl borine-glycol methyl phosphite, $$(CH_3)_3B-CH_3O-\overline{P-OCH_2CH_2O}$$

diborane-glycol methyl phosphite, $$B_2H_6 \cdot CH_3O-\overline{P-OCH_2CH_2O}$$

phenyl dimethyl boronate-glycol methyl phosphite, $$(C_6H_5)B(OCH_3)_2 \cdot CH_3O-\overline{P-O\,CH_2CH_2O}$$

diphenyl methyl borinate-glycol methyl phosphite, $$(C_6H_5)_2B(OCH_3) \cdot CH_3O-\overline{P-O\,CH_2CH_2O}$$

tri-o-chloro phenyl borate-glycol methyl phosphite, $$(ClC_6H_4O)_3B \cdot CH_3O-\overline{P-O\,CH_2CH_2O}$$

diphenyl diboron oxide glycol methyl phosphite, $$[(C_6H_5)_2B]_2O \cdot CH_3O-\overline{P-O\,CH_2CH_2O}$$

glycol methyl boronate-glycol methyl phosphite, $$CH_3-B \overline{-O\,C_2H_4O} \cdot CH_3O-\overline{P-O.CH_2CH_2O}$$

trimethyl borine-glycol methyl phosphonite, $$(CH_3)_3B \cdot CH_3-\overline{P-O\,CH_2CH_2O}$$

diborane-glycol methyl phosphonite, $$B_2H_6 \cdot CH_3-\overline{P-O\,CH_2CH_2O}$$

phenyl dimethyl boronate-glycol methyl phosphonite, $$(C_6H_5)B(OCH_3)_2 \cdot CH_3 \cdot \overline{P-O\,CH_2CH_2O}$$

diphenyl methyl borinate-glycol methyl phosphonite, $$(C_6H_5)_2B(OCH_3) \cdot CH_3 - \overline{P-O\,CH_2CH_2O}$$

tri-o-chloro phenyl borate-glycol methyl phosphonite, $$(ClC_6H_4O)_3B \cdot CH_3 \cdot \overline{P-O\,CH_2CH_2O}$$

diphenyl diboron oxide glycol methyl phosphonite, $$[(C_6H_5)_2B]_2O \cdot CH_2 \overline{P-O\,CH_2CH_2O}$$

and glycol methyl boronate-glycol methyl phosphonite, $$CH_3-\overline{B-O\,C_2H_4O} \cdot CH_3 \overline{P-O\,CH_2CH_2O}$$

tris decyl borine-triphenyl phosphine,
tributyl borine-tri-o-tolyl phosphine,
tributyl phosphine-tris decyl phosphite,
tri-p-tolylborine-triphenyl phosphine,
tributyl borine-tri p-chlorophenyl phosphite,
tris decyl borate-tri octyl phosphine,
triphenyl borate-triphenyl phosphite.

Other boron-phosphorus coordination compounds which are valuable fuel additives for use in accordance with the present invention are borine-phosphines encompassed by the following formula:

$$R^4{}_3B \cdot [PR^2{}_3]_n$$

The operative boron-phosphorus coordination fuel additives which have been found to be effective in improving engine performance as described herein have the Formulae I and II set forth above.

The fuel additive boron-phosphorus coordination compounds of the invention and particularly the novel compounds described hereinabove are prepared normally by admixture in molar proportions within a range of 1:2 to 2:1 of a tri-valent boron-containing compound selected from the group including an unsubstituted borane containing within the range of 2 to 10 carbon atoms, a boronate, borinate or borate compound, a hydrocarbyl boron oxide, glycol borate, glycol boronate and a borine; and a trivalent phosphorus-containing compound selected from a phosphite, a phosphonite, phosphinate, glycol phosphite, glycol phosphonite, and, particularly when the tri-valent boron component is a borine having attached thereto one hydrocarbyl radical of at least 4 carbon atoms, and a phosphine. Where the trivalent phosphorus component is caused to react with a borane, the molar ratio of the aforesaid phosphorus component may range upwards to about 10 to 1.

The compounds of the invention are generally colorless liquids; or crystalline or amorphous solids which are, as noted above, readily soluble in organic solvents, and particularly in ethers and aliphatic and aromatic hydrocarbon solvents, such as for example, diethyl ether, toluene, xylene, isooctane and the like, wherein they are in fact often incorporated to form clear solutions in order to facilitate handling. This is, of course, particularly true where the undissolved substantially pure coordination complex is an amorphous or crystalline solid rather than a liquid. Using a solvent such as diethyl ether in the reaction mixture will increase the speed of reaction; but this advantage is offset in some cases by resulting processing difficulties. The reaction is normally permitted to proceed at room or reflux temperatures.

The compounds when used as fuel additives are introduced into an engine fuel and dissolved therein. The concentration of additive in the fuel when employed in internal combustion engines is preferably about 0.5 gram of additive per gallon of fuel. Amounts of as little as 0.25 gram per gallon of gasoline and as much as 1.0 gram per gallon also constitute effective concentrations.

The following examples are further illustrative of the invention:

*Example 1*

To 12.1 grams of triphenyl borine in 30 ml. of isooctane was added 10.1 grams of tributyl phosphine at 25° C. A slight heat of reaction was noticed. After the addition was complete, the solution was refluxed for one hour. Upon cooling, a white solid, the coordination compound triphenyl borine-tributyl phosphine, crystallized and was separated by filtration, washed with a slight amount of isooctane and dried at 60° C. and under 30 mm. vacuum; M.P. 118° C.–120° C.

*Analysis.*—Boron-theory: 2.04%; found: 2.35%; phosphorus-theory: 7.1%; found: 6.9%.

The triphenyl borine-tributyl phosphine complex thus prepared was tested on the following two automobile engines:

(a) A 1951 Ford V–8 cylinder engine, developing 100 horsepower at 3600 r.p.m. with a 6.8 to 1 compression ratio and driven over 90,000 miles and typical of an older engine with heavy combustion chamber deposits which used regular grade fuel.

(b) A 1959 Super 88 Oldsmobile, V–8 cylinder engine, developing 315 horsepower at 4600 r.p.m. at a compression ratio of 9.8 to 1. This engine had been driven 23,000 miles and is typical of the new high compression engine requiring premium grade, leaded fuel.

(a) The 1951 Ford engine was difficult to start; upon moderate acceleration and under heavy load it tended to knock and "ping"; idled very erratically; had poor acceleration and hill-climbing ability; and had poor gas economy. To a tank of regular gasoline was added one-half (0.5) gram per gallon of triphenyl borine-tributyl phosphine complex. After the car was driven about ten miles, improvement in overall performance was noticeable. After fifty miles had been driven, all knock and "ping" on acceleration was eliminated and improvement in gas consumption, idling characteristics, hill-climbing ability and ease of starting was evident.

(b) The 1959 Oldsmobile Super 88 engine was tested in the following way: The premium fuel was completely consumed and the tank drained. Ten gallons of regular grade leaded gasoline was placed in the tank, and the car was driven twenty miles on level grade. Surface ignition was evidenced by knock and rumble on acceleration. With full acceleration, the knock was so severe as to require deacceleration to prevent serious engine damage. Hill-climbing ability on a 20–25 degree grade was severely impaired, requiring down-shifting to maintain the car in motion. One half gram per gallon of triphenyl borine-tributyl phosphine was added to the remaining fuel in the tank. With continued driving, a progressive improvement in performance was noted until after thirty miles of driving, the car could not be made to knock under the conditions previously described (on full acceleration and on hill climbing in high gear). An all-around improvement in engine performance was noted. The car was driven a total of one thousand miles on regular gasoline, treated with one-half gram of complex per gallon, and performed under all conditions without rumble or knock.

*Example 2*

To 24.2 grams (.1 mole) of triphenyl borine, (M.W. 242.12), M.P. 136° C.–142° C. dissolved in diethyl ether was added at 25° C., 26.2 grams of triphenyl phosphine, (M.W. 262.28), (M.P. 79° C.) dissolved in diethyl ether. A precipitate occurred. The solution was refluxed for one hour after which the precipitate was filtered, washed with ether and dried in air. The crystalline solid material, triphenyl borine-triphenyl phosphine complex, had a melting point (M.P.) of 207° C. to 207.5° C. under nitrogen.

*Analysis.*—Boron-theory: 2.0%; found: 1.9%; phosphorus-theory: 6.15%; found: 6.0%.

This product may be dissolved in toluene or another suitable hydrocarbon solvent and incorporated in a motor fuel for use with internal combustion engines in the manner described in Example 1.

*Example 3*

To 20.2 grams (0.1 mole) of tributyl phosphine dissolved in 20 cc. of isooctane and in an atmosphere of nitrogen, was added 18.2 grams of tributyl borine from a cylinder. The reaction temperature was maintained at 25° C. by water-cooling the reactor as considerable heat was liberated during this addition. The solvent was removed by distillation under vacuum and a clear liquid, a complex of tributyl borine-tributyl phosphine, which was stable in air, remained.

The coordination complex thus formed may be incorporated directly into a motor fuel for use in an internal combustion engine as described in Example 1.

*Example 4*

To 20.2 grams (0.1 mole) of tributyl phosphine dissolved in 50 cc. of anhydrous ether was added 10.4 grams of trimethyl borate. A clear solution resulted from which the ether was removed by atmospheric distillation leaving a clear, stable liquid which formed no addition complex with carbon disulfide, did not liberate boric acid on shaking with water and was stable in contact with air.

This product, the coordination complex of tributyl phosphine and trimethyl borate, may be dissolved in a solvent such as isooctane and the resulting solution incorporated in Example 1.

*Example 5*

To 10.1 grams (0.05 mole) of tributyl phosphine at 30° C. was added 19.8 grams (0.05 mole) of tri-o-chlorophenyl borate. A clear solution resulted in which a white crystalline precipitate immediately formed. On standing for two hours, the entire mass was converted into a white crystalline solid. The solid was dissolved in isooctane and reprecipitated as fine solid crystals by removal of the solvent. The solid was filtered and dried under vacuum, yielding 23 grams of a white powder-like solid (M.P. 46° C. to 51° C.).

*Analysis.*—Boron-theory: 1.85%; found, 2.0%; phosphorus-theory: 5.18%; found: 5.0%.

This product, the coordination complex of tri-o-chlorophenyl borate and tributyl phosphine, may be dissolved in toluene or the like and the resulting solution incorporated in a suitable motor fuel for use in the manner described in Example 1.

The coordination complexes of the present invention also function as flame speed accelerators increasing the flame speed and thus improving the cetane number of diesel fuels. They are, in addition, ignition promotors for other hydrocarbon fuels and have been found to be useful anti-oxidants in hydrocarbon fuels.

What is claimed is:

1. A hexavalent boron-phosphorus containing coordination complex having a formula selected from the group consisting of $(R_1)_3B \cdot P(R_2)_3$ and $(R_4)_3B \cdot P(R_3)_3$ where $R_1$ is a hydrocarbyl group containing 4 to 10 carbon atoms, $R_2$ is alkyl, $R_3$ is monocyclic carbocyclic aryl and $R_4$ is alkyl.

2. The coordination complex of the formula

where $R_1$ is a hydrocarbyl group containing 4 to 10 carbon atoms and $R_2$ is alkyl.

3. A coordination complex according to claim 3 wherein $R_1$ is aryl.

4. A coordination complex according to claim 4 wherein $R_1$ is phenyl.

5. A coordination complex according to claim 3 wherein $R_1$ is alkyl.

6. A coordination complex of the formula

where $R_1$ is an alkyl group containing 4 to 10 carbon atoms and $R_3$ is monocyclic carbocyclic aryl.

7. Triphenyl borine-tributyl phosphine.

8. Tributyl borine-tributyl phosphine.

References Cited

UNITED STATES PATENTS

| | | | |
|---|---|---|---|
| 3,158,451 | 11/1964 | Bell | 44—69 |
| 2,920,107 | 1/1960 | Burg et al. | 260—606.5 X |
| 3,092,665 | 6/1963 | Wagner | 260—606.5 |
| 3,257,455 | 6/1966 | Ashby | 260—606.5 X |

OTHER REFERENCES

Witting et al.: "Chem. Ber.," 88, 1660.

TOBIAS E. LEVOW, *Primary Examiner.*

CHARLES B. PARKER, HELEN M. McCARTHY,
*Examiners.*

D. R. PHILLIPS, W. F. W. BELLAMY,
*Assistant Examiners.*